J. A. GARDNER.
TRACE HOOK.
APPLICATION FILED MAR. 25, 1921.

1,426,176.

Patented Aug. 15, 1922.

J. A. Gardner
INVENTOR

UNITED STATES PATENT OFFICE.

JAMES A. GARDNER, OF DIXON, MISSISSIPPI.

TRACE HOOK.

1,426,176. Specification of Letters Patent. Patented Aug. 15, 1922.

Application filed March 25, 1921. Serial No. 455,546.

*To all whom it may concern:*

Be it known that I, JAMES A. GARDNER, a citizen of the United States, residing at Dixon, in the county of Neshoba and State of Mississippi, have invented new and useful Improvements in Trace Hooks, of which the following is a specification.

This invention comprehends the provision of a singletree hook designed to prevent the trace from being casually separated therefrom, by allowing the trace to be readily and quickly associated with the hook or removed therefrom as the occasion requires.

The nature and advantages of the invention will be better understood when the following detailed description is read in connection with the accompanying drawing, the invention residing in the combination, construction and arrangement of parts as claimed.

In the drawing forming part of this application, like numerals of reference indicate the similar parts in the several views and wherein: —

Figure 1:
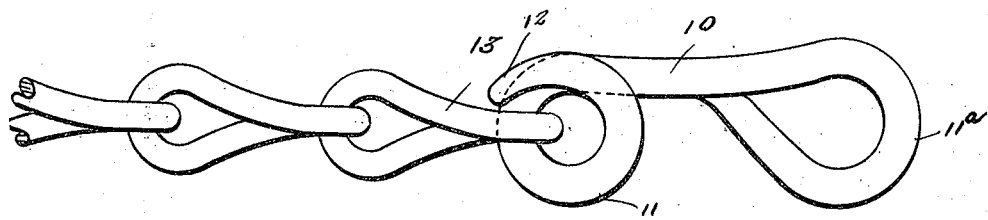
Figure 1 is a side elevation of the device forming the subject matter of my invention.
Figure 2:
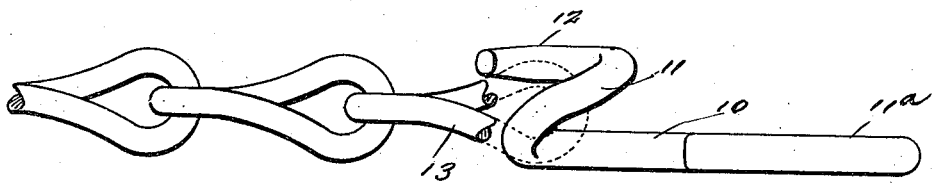
Figure 2 is a top plan view.

The hook forming the subject matter of my invention comprises a shank 10 terminating at one end to provide an eye 11$^a$ by means of which the hook can be suitably connected to a singletree (not shown) in any well known manner. The bill of the hook is coiled as shown, the convolution 11 being slightly offset with relation to the shank 10, while the terminal 12 is also curved from a continuation of the convolution 11 and disposed to one side thereof. By reason of the specific disposition of the terminal 12, it can be clearly understood that when the trace is loosened, the eye end of the hook will be lowered by its own weight, and the terminal 12 will extend over the adjacent ring 13, that is, engage and grip the outside of the ring to prevent any possible separation of the parts. The adjacent ring of the trace 13 can be quickly and easily arranged within the coil by passing about the convolution 11, and when associated with the hook in the manner illustrated in Figure 1, it is held against casual separation from the hook. The construction of the hook is such that the trace can be easily associated with the hook or removed therefrom.

While it is believed that from the foregoing description the nature and advantages of the invention will be readily apparent, I desire to have it understood that I do not limit myself to what is herein shown and described, and that such changes may be resorted to when desired, as fall within the scope of what is claimed.

What I claim is:—

A trace hook of the character described comprising a shank terminating to provide a single convolution wholly disposed to one side of the shank, and adapted to be received by the adjacent link of the trace, the terminal of said convolution being also curved to form a continuity thereof and projecting a slight distance beyond the circumference of said convolution, and spaced an appreciable distance from said shank to engage and bind against the outer edge of said link for the purpose specified.

In testimony whereof I affix my signature,

JAMES A. GARDNER.